(No Model.) 2 Sheets—Sheet 1.

L. E. PAINE.
SELF FEED RIP SAWING MACHINE.

No. 448,163. Patented Mar. 10, 1891.

Witnesses
H. D. Nealy.
E. B. Griffith.

Inventor
Luther E. Paine
By his Attorney
C. P. Jacobs.

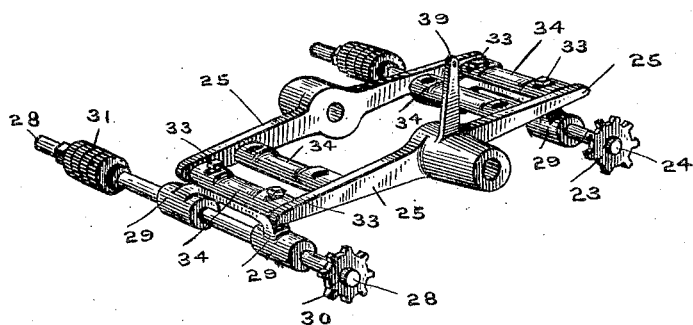

UNITED STATES PATENT OFFICE.

LUTHER E. PAINE, OF EDINBURG, INDIANA, ASSIGNOR TO THE EDINBURG FOUNDRY AND MACHINE COMPANY, OF SAME PLACE.

SELF-FEED RIP-SAWING MACHINE.

SPECIFICATION forming part of Letters Patent No. 448,163, dated March 10, 1891.

Application filed October 11, 1890. Serial No. 367,861. (No model.)

*To all whom it may concern:*

Be it known that I, LUTHER E. PAINE, of Edinburg, county of Johnson, and State of Indiana, have invented certain new and useful Improvements in Self-Feed Rip-Sawing Machines; and I do hereby declare that the following is a full, clear, and exact description thereof, reference being had to the accompanying drawings, in which like figures refer to like parts.

My invention relates to the construction of feeding mechanism for rip-sawing machines, and will be understood from the following description.

Figure 1:
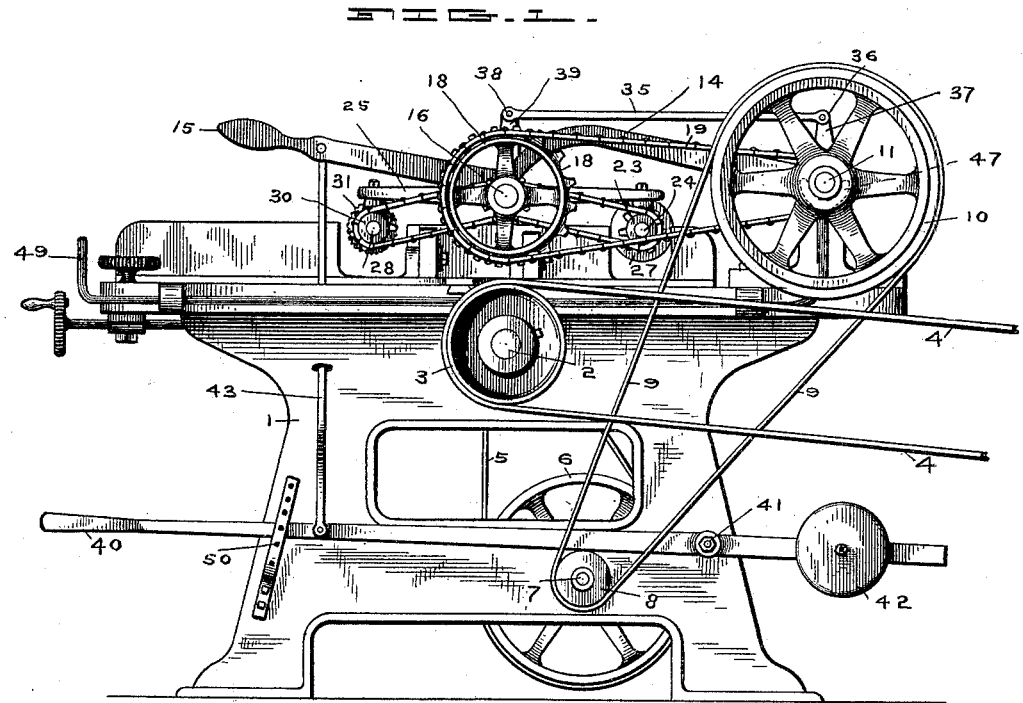
Figure 2:
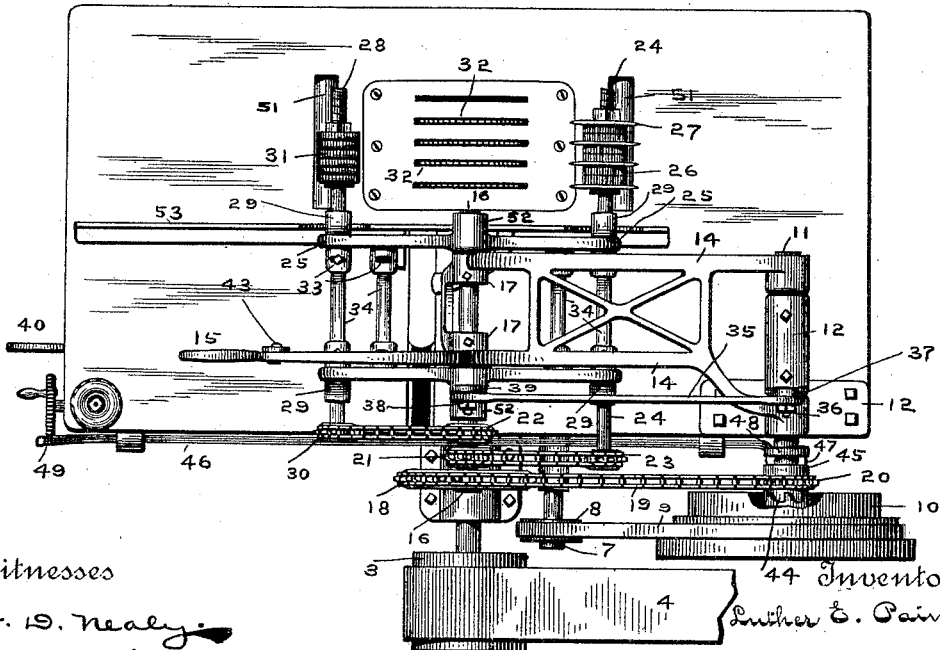

In the drawings, Figure 1 is a side elevation. Fig. 2 is a top plan view. Fig. 3 is a detail perspective view of the frame that carries the boxings for the shafts of the feed-rolls.

In detail, 1 is the frame-work of the machine, providing bearings for the main shaft 2, on which is mounted the driving-pulley 3, driven by a belt 4, leading to the line shaft or engine. Upon the main shaft, about midway beneath the top, is mounted a second pulley, (not shown,) from which a belt 5 leads to a driving-pulley 6, mounted on a counter-shaft 7, having a small pulley 8 on the outer end, from which a belt 9 leads to a pulley 10, mounted on a counter-shaft 11, having a central bearing in a bracket 12, bolted to the top of the table.

14 is a movable frame-work carried on the counter-shaft 11, with which is connected an operating-lever 15.

16 is a counter-shaft journaled in boxings 17, formed integral with the frame 14, and on the outer end of this shaft is mounted a large sprocket-wheel 18, from which a drive-chain 19 leads to a smaller sprocket 20, mounted on the counter-shaft 11 inside of the pulley 10. 21 and 22 are similar sprocket-wheels, which are also mounted on the counter-shaft 16. A drive-chain leads from the sprocket 21 to a sprocket 23, mounted on a shaft 24, which is carried in boxings 29, connected to the lower frame 25, hung upon the axle 16 outside and below the frame 14. The shaft 24 carries upon its opposite end, directly over the table in line with and behind the saws, a feed-wheel 26, composed of corrugated sections, with disks 27 interposed, the office of the corrugated sections being to draw the board onward and that of the disks to travel in the kerfs formed by the saws and prevent their coming together and cramping the saws in their work. A shaft 28, also mounted in boxings 29, connected with the lower frame 25, has mounted on its outer end a sprocket-wheel 30, from which a drive-chain leads to the sprocket 22, and on the opposite end of the shaft 28 is mounted a feed-wheel 31, composed of corrugated sections in front of the saws 32, which are mounted on the main shaft 2.

33 are set-screws working in slots formed in the enlarged ends of cross-bars 34, of which two are provided at each end of the lower frame-work 25, and by loosening these set-screws the axles of the feed-rolls, with their boxings, may be bodily removed and set under the inner cross-bars when it is desired to feed closer to the saws, and vice versa. Of course in doing this some links will have to be removed from the sprocket-chains which drive the feed-rolls. Again, if the board is disposed to leave the fence-board 53, then by loosening the set-screws 33 the forward feed-roll may be moved slightly toward the saw, and this will feed the lumber toward the fence-board, and if the board binds against the fence-board too much by the same means the feed-roll may be set farther back. A similar adjustment, of course, is possible with the rear feed-roll whenever the same may become necessary.

35 is a rod pivoted at 36 to a stationary arm 37, extending upward from the bracket 12, and this rod is pivoted at 38 to an arm 39, formed on and connected with the lower frame 25. Through this rod the two frames 14 and 25 are connected, so as to be operated simultaneously by the movement of the lever 15. The connection thus made through this arm between the upper and lower frames secures a simultaneous vertical movement of the axles of the front and rear feed-rolls, keeping them always in the same horizontal plane with each other, so that when one is lifted by the movement of the lever the other is correspondingly lifted, and when the board has passed out from beneath the front feed-roll such roll will not drop down, but will continue in the same position while the board is passing beneath the roll on the opposite side, and this allows a new board to be inserted and fed beneath the front feed-roll, while the board that has just passed is still under the control of the feed-roll behind the saws.

40 is a lever pivoted at 41 to the machine-frame below, on which is mounted a counter-weight 42, which is adjustable on the end of such lever, so as to increase or decrease the pressure of the feed-rolls.

At 43 is a rod, which connects the upper lever 15 to the lower lever 40, enabling the adjustable weight 42 upon the end of the lever 40 to control the pressure of the feed-rolls upon the boards.

44 is a clutch formed on the hub 45 of the sprocket-wheel 20, this clutch being adapted to engage with a similar part formed on the hub of the pulley 10. This clutch may be thrown in or out of gear with its corresponding part by means of a rod 46, whose inner forked end 47 works in a groove formed in the hub 45 of the sprocket-wheel 20, so that by turning this rod, which is provided with a bend or handle 49, over to the left the clutch 44 is disengaged, and it, with its sprocket-wheel, is thrown to the left on the shaft 11, so that the sprocket is no longer operated by the revolution of the pulley 10, and the feed mechanism will then cease to revolve, while the saws continue to work.

50 is a strap bolted to the side of the machine-frame, having holes to receive a pin, so that when it is desired to throw the feed mechanism up out of the way it may be locked by means of the pin in any one of the holes of the strap. This lever is also used for the purpose of adjusting the feed-rolls to any thickness of stuff desired.

The corrugated sections of the feed-rolls and the disks, which have knife or beveled edges, are all detachable, and may be removed from the shafts on which they are carried after unscrewing the nuts, and it will be easy to increase or decrease the number of these sections, so as to correspondingly vary the length of the rolls, if desired. The usual friction-rolls 51 are mounted beneath the table, so that the board passes between these and the upper feed-rolls.

The counter-shaft 16 is journaled not only in the boxings 17, formed upon the upper frame 14, but also in boxings 52, connected with the lower frame 25, so that the two frames are united at this central point by this shaft as well as by the connecting-rod 35, and thus are operated simultaneously by either the upper lever 15 or the lower lever 40, and the counter-weight 42 of the latter is thus enabled to control the pressure of the feed-rolls upon the material.

What I claim as my invention, and desire to secure by Letters Patent, is the following:

1. In a rip-sawing machine, a main frame, a driving-shaft journaled therein carrying a pulley on one end and saws on the other, a bracket bolted to such frame or table, an upper vertically-swinging frame journaled on a shaft carried in bearings connected to such bracket, a lower frame connected beneath to such swinging frame, a counter-shaft journaled therein, front and rear feed-rolls detachably mounted on such shafts, such upper and lower frames connected by a shaft passing centrally through both, sprocket-wheels mounted on such shaft, drive-chains leading therefrom to sprocket-wheels carried on the shafts of the feed-rolls, and a lever connected to such upper vertically-swinging frame for operating the same, whereby the upper and lower frames may be lifted simultaneously and the front and rear feed-rolls maintained in the same horizontal plane, all combined substantially as shown and described.

2. In a rip-sawing machine, a frame, a main shaft journaled therein, a driving-pulley and saws mounted on such shaft, front and rear feed-rolls mounted on counter-shafts journaled in boxings adjustably connected to an auxiliary frame, sprocket mechanism connected to the other end of the feed-roll, shafts for driving the same, a vertical frame swinging on a counter-shaft mounted in bearings on a bracket connected to the main frame or table, such swinging frame connected to the auxiliary frame below by a shaft centrally journaled in both and carrying sprocket-wheels for driving the feed-rolls, an auxiliary pulley mounted upon a shaft having bearings above the machine-table driven by belts from the main shaft, a clutch mechanism located inside such pulley, and a rod connected thereto for operating the same so as to throw the feed-rolls in or out of gear, as desired, and a lever pivoted to the main frame above, having an adjustable weight on its inner end for regulating the pressure of the feed-rolls upon the material, all combined substantially as shown and described.

3. In a rip-sawing machine, a frame, a driving-shaft carrying a pulley and saws mounted in bearings thereon, feed-rolls mounted on shafts carried in a vertically-movable frame, sprocket-wheels mounted on the shafts of the feed-rolls and on a central counter-shaft for driving the feed-rolls, drive-chains leading from such sprocket-wheels to a counter-shaft driven by belts from the main shaft, a lever for lifting the vertically-movable frame, whereby the relative position of the feed-rolls is maintained in the same horizontal plane, such lever connected to a lever pivoted to the machine-frame below, and a counter-weight mounted on such lower lever and adjustable thereon for regulating the pressure of the feed-rolls upon the material, all combined substantially as shown and described.

In witness whereof I have hereunto set my hand this 4th day of October, 1890.

LUTHER E. PAINE.

Witnesses:
WM. E. DEUPREE,
C. W. DAVIS.